United States Patent [19]

Schartman et al.

[11] Patent Number: 5,305,661
[45] Date of Patent: Apr. 26, 1994

[54] APPARATUS AND METHOD FOR POSITIONING A LINK

[75] Inventors: Daniel J. Schartman, East Peoria; David J. Balzer, Peoria, both of Ill.

[73] Assignee: Caterpillar Inc., Peoria, Ill.

[21] Appl. No.: 956,208

[22] Filed: Oct. 5, 1992

[51] Int. Cl.⁵ .............................................. G05G 1/04
[52] U.S. Cl. ................................. 74/571 M; 403/84; 403/107
[58] Field of Search ............. 74/571 M, 571 R, 586; 403/91, 92, 93, 94, 95, 104, 106, 107, 84

[56] References Cited

U.S. PATENT DOCUMENTS

| | | | |
|---|---|---|---|
| 95,174 | 9/1869 | Wells | 74/571 M |
| 135,380 | 1/1873 | Stiles | 74/586 X |
| 306,972 | 10/1884 | Stiles | 74/571 M |
| 310,903 | 1/1885 | McFarland | 74/571 M |
| 1,097,185 | 5/1914 | Oehrle | 74/586 X |
| 2,067,399 | 1/1937 | Hughes | 74/571 M |
| 2,477,587 | 8/1949 | Doutt | 74/571 M |
| 2,662,420 | 12/1953 | French et al. | 74/586 |
| 2,709,924 | 6/1955 | Castelli | 74/571 M |
| 2,753,721 | 7/1956 | Latta | 74/586 |
| 3,120,281 | 2/1964 | Peveler et al. | 74/571 M |
| 3,135,402 | 6/1964 | McCanse | 74/571 M |
| 3,857,345 | 12/1974 | Higgins | 74/571 M |
| 4,805,482 | 2/1989 | Boda | 74/571 |
| 4,813,163 | 3/1989 | Livingston et al. | 74/571 R |

Primary Examiner—Leslie A. Braun
Assistant Examiner—Ryan W. Massey
Attorney, Agent, or Firm—Calvin E. Glastetter

[57] ABSTRACT

Links are useful for supporting and positioning spaced apart housing relative to each other. To allow for tolerance stackup the length of the link needs to be adjustable and still be strong enough to withstand high forces. The subject adjustable link includes a first end portion removably attached to a axle structure and a second end portion attached to a ripper structure. The second end portion includes an eccentric cam which is rotatable to adjust the length of the link. When the cam is properly adjusted it is moved into contact with a locking plate on the ripper structure to prevent rotation. A spacer washer is positioned between the cam and the ripper structure to prevent disengagement of the cam from the ripper structure. This arrangement of components provides for adjusting the length of a link and provides a locking structure which will withstand the high forces in the structure.

5 Claims, 3 Drawing Sheets

APPARATUS AND METHOD FOR POSITIONING A LINK

TECHNICAL FIELD

This invention relates generally to a link connectable between two spaced structures and more particularly to an arrangement for adjusting and maintaining the spacing between the mounting holes of the link.

BACKGROUND ART

Construction vehicles commonly have a ripper structure which is used to support a ripper. To stabilize and support the ripper structure, a link is attached between the ripper structure and the axle structure. To allow for dimensional tolerances, the link must be adjustable lengthwise. In a previous design a threaded rod with a threaded adjustable end portion was used. One problem associated with the threaded rod and end portion was the difficulty in accurately cutting threads in the large diameter rod and end portion. Another problem associated with the threaded assembly is that the production cost is expensive and the scrap rates are high because the possibility of galling is higher with larger diameter threads.

The present invention is directed to overcome one or more of the problems as set forth above.

DISCLOSURE OF THE INVENTION

In one aspect of the present invention a length adjustment apparatus is provided for connection between two spaced structures. The apparatus includes an elongated link having a first end portion connected to one of the structures and a second end portion connected to the other structure. An eccentric cam is rotatably mounted within the link. The eccentric cam includes a locking flange and an adjustment portion. A locking plate is fixedly attached to the structure and interacts with the locking flange to prevent rotation of the cam.

The present invention provides a length adjustment apparatus which is positively locked in position to prevent rotation of the eccentric cam. The apparatus includes a locking plate which is fixedly attached to the structure and a cam and link arrangement which is held in the locking position by a spacer washer.

BEST MODE FOR CARRYING OUT THE INVENTION

Figure 1:
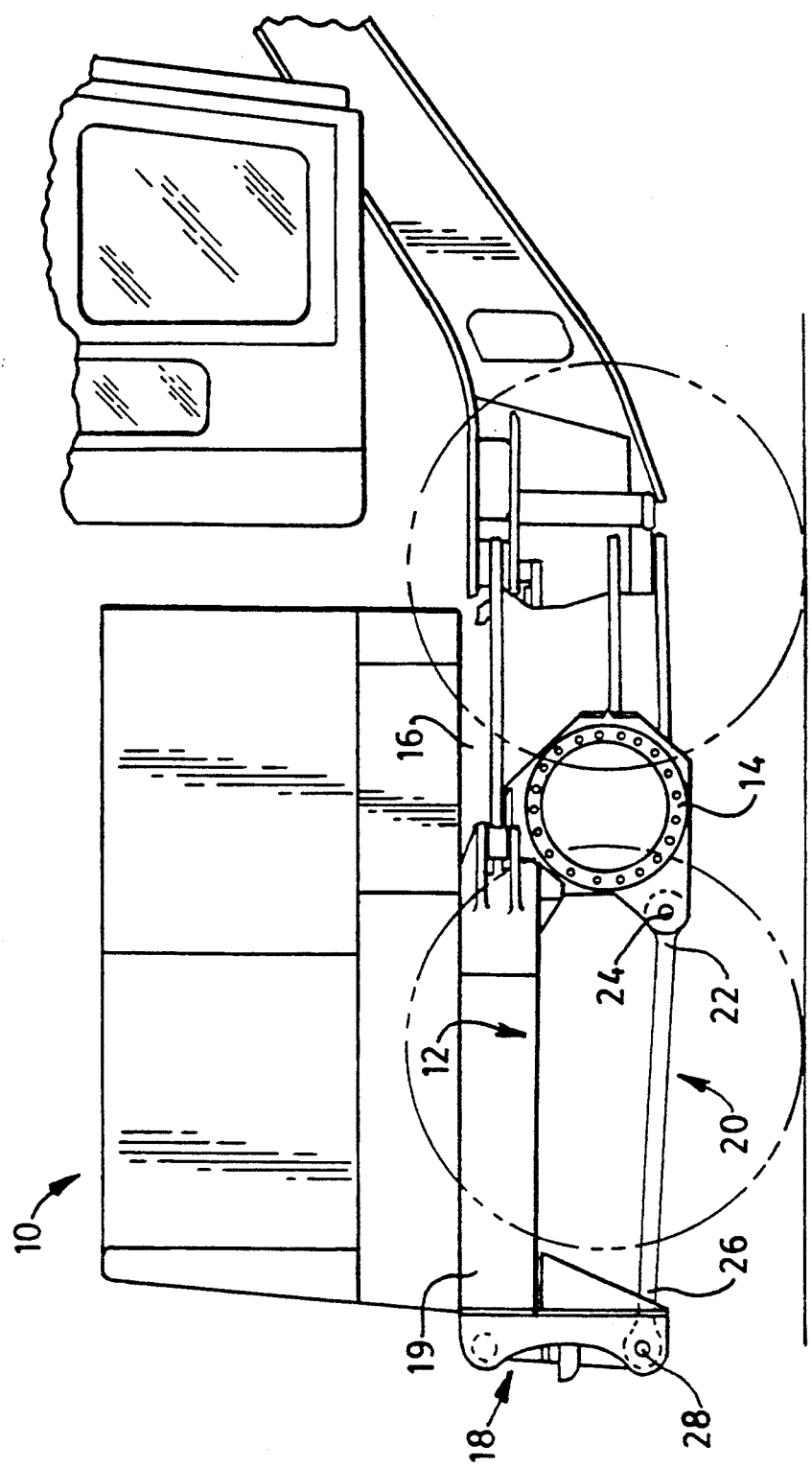
FIG. 1 is a side view of a vehicle showing the present invention connected between two spaced apart structures.

Referring to FIG. 1, a vehicle 10 is shown having a main frame 12. A first or axle structure 14 is connected to one end 16 of the main frame 12. A second or ripper structure 18 is connected to a second end 19 of the main frame 12. An adjustable link 20 is connected between the axle structure 14 and the ripper structure 18. The link 20 has a first end portion 22 connected to the axle structure 14 by a pin 24. A second end portion 26 of the link 20 is connected to the ripper structure 18 by a pin 28.

Figure 2:
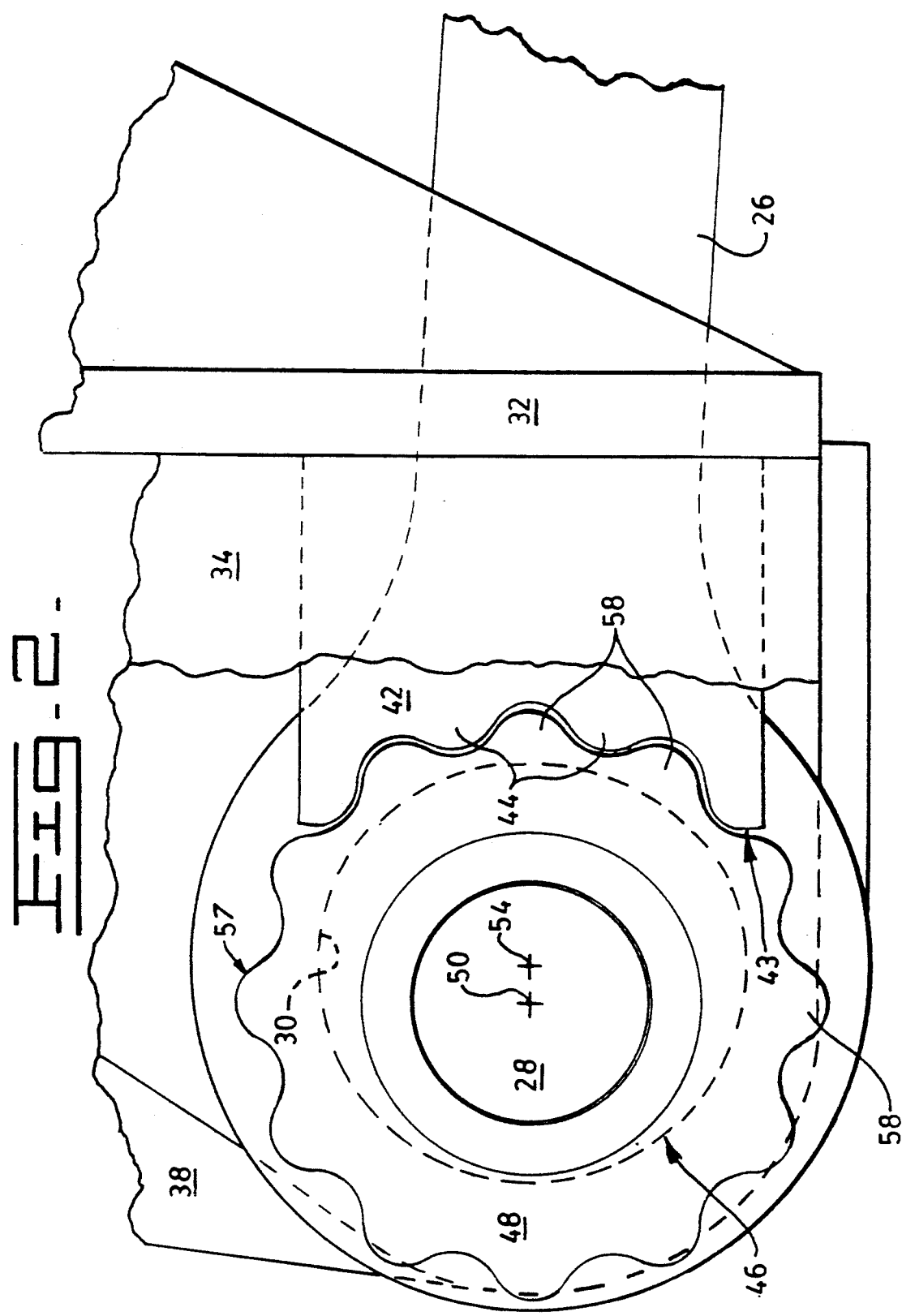
FIG. 2 is an enlarged partial side view of the present invention.
Figure 3:
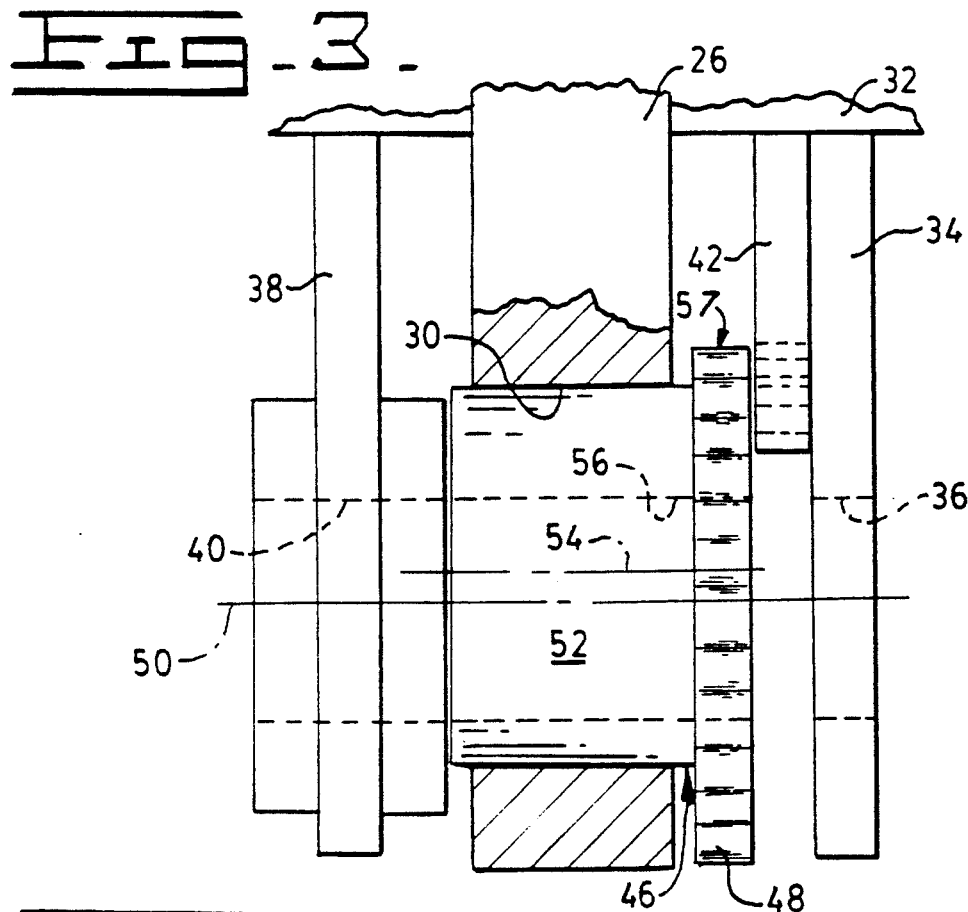
FIG. 3 is a plan view showing the parts in the disengaged position.
Figure 4:
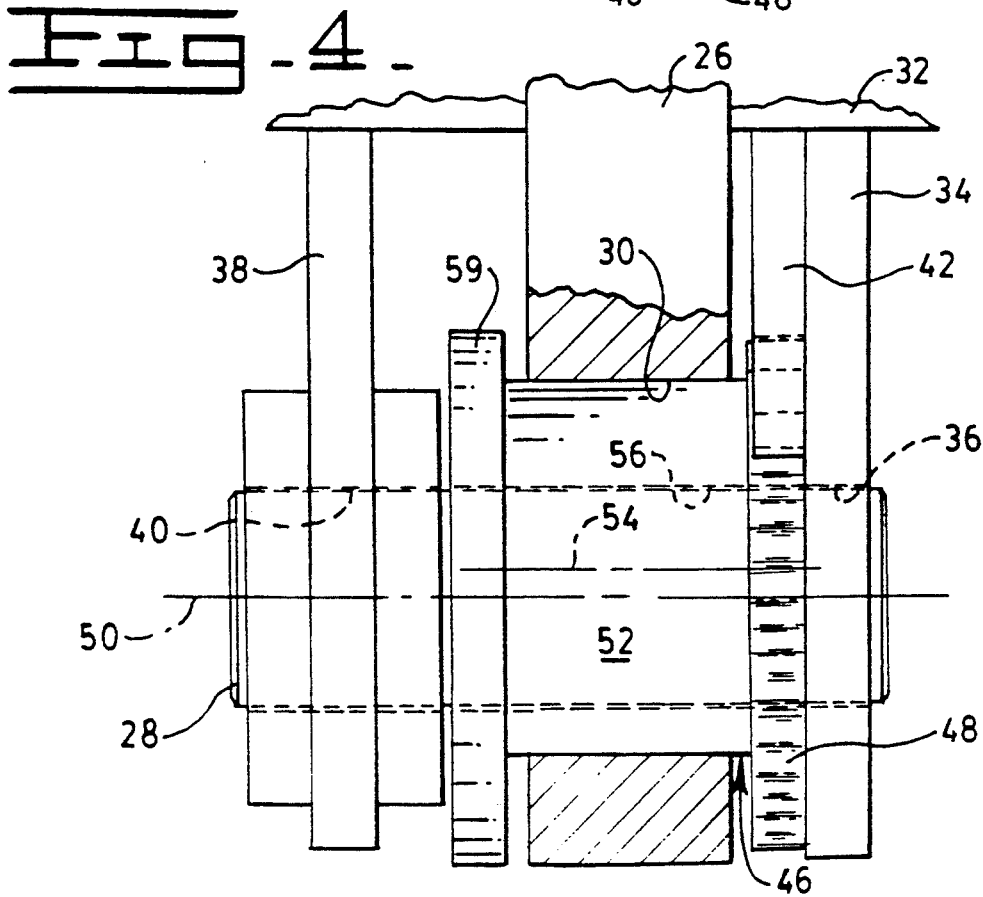
FIG. 4 is a plan view showing the parts in the engaged position.

Referring now to FIGS. 2-4, the ripper structure 18 includes a base plate 32. A first mounting bracket 34 is attached to the base plate 32 and extends therefrom. The first mounting bracket 34 has a hole 36. A second mounting bracket 38, spaced from the first mounting bracket 34, is also attached to the base plate 32. The second mounting bracket 38 has a hole 40 which is the same diameter as the hole 36 and is also aligned with the hole 36 in the first mounting bracket 34. A locking plate 42 is positioned between the first and second mounting brackets 34,38 and is fixedly attached to the first mounting bracket 34 and the base plate 32. The locking plate 42 has an end surface 43 opposite the base plate 32 which has a plurality of locking lobes 44. An eccentric cam 46 is rotatably positioned within the hole 30 of the link 20. The eccentric cam includes a locking flange 48 having a radial axis 50, and an adjustment portion 52 positioned within the hole 30 having a radial axis 54 off-set from the radial axis 50 of the locking flange 48. A hole 56 extends through the locking flange 48 and the adjustment portion 52. The hole 56 is aligned along the radial axis 50 of the locking flange 48. An outer periphery 57 of the locking flange 48 has a plurality of lobes 58 which interacts with the lobes 44 of the locking plate 42. A spacer washer 59 is positioned between adjustment portion 52 of the cam 46 and the mounting bracket 38 to prevent disengagement of the locking flange 48 from the locking plate 42. The spacer washer 59 includes a central hole 60. The pin 28 passes through the holes 36, 40, 56 and 60 to mount the link 20 to the mounting brackets 34,38 of the ripper structure 18 and prevents rotation of the cam 46.

Industrial Applicability

In use, the link 20 of the present invention needs to be adjustable to provide for the dimensional tolerances between the axle structure 14 and the ripper structure 18. The first end portion 22 of the link 20 is pivotally attached to the axle structure 14 by a pin 24. The second end portion 26 of the link is aligned with and between the mounting brackets 34,38. The eccentric cam 46 is rotated to align the hole 56 with the holes 36,40 of the mounting brackets 34,38. When the cam 46 is rotated the proper amount the link 20 and cam 46 is moved to engage the lobes 58 of the cam 46 with the lobes 44 of the locking plate 42 to prevent rotation of the cam 46. The spacer washer 59 is inserted between the cam 46 and the mounting bracket 38 to prevent disengagement of the locking flange 48 of the cam 46 from the locking plate 42 of the ripper structure 18. The pin 28 is inserted through the mounting brackets 34,38 and the cam 46 to attach the link 20 to the ripper structure 18.

In view of the forgoing, it is readily apparent that the structure of the present invention provides an adjustable link with an eccentric cam which is maintained in position by a locking plate fixedly attached to the ripper structure and spacer washer positioned between the link and the ripper structure. The locking plate and spacer washer will withstand the high forces associated with the ripper being moved through the material being ripped.

Other aspects, objectives and advantages of this invention can be obtained from a study of the drawings, the disclosure and the appended claims.

We claim:

1. A length adjustment apparatus, comprising:
a first structure;

a second structure spaced from the first structure;

an elongated link having a first end portion removably connected to the first structure and a second end portion removably connected to the second structure, the second end portion includes a mounting hole;

an eccentric cam rotatably mounted within the mounting hole of the link and including a locking flange having a plurality of lobes on an outer periphery and an adjustment portion axially offset from the locking flange, a hole extends through the locking flange and the adjustment portion; and a locking plate welded to the second structure, and including an end surface having a plurality of lobes interacting with the plurality of lobes on the locking flange to prevent rotation of the cam.

2. The length adjustment apparatus of claim 1 wherein the second structure includes spaced first and second mounting brackets having aligned holes therein.

3. The length adjustment apparatus of claim 2, wherein the locking plate is welded to the first mounting bracket and a spacer washer having a central hole defined therein is positioned between the adjustment portion and the second mounting bracket.

4. The length adjustment apparatus of claim 3 includes a pin which passes through the holes in the first and second mounting brackets, the cam and the spacer washer for attaching the second end portion of the link to the second structure.

5. A method for positioning a link comprising the steps of:

attaching a first end portion of the link to a first structure;

aligning a second end portion of the link with spaced mounting holes in a second structure;

rotating an eccentric cam within the second end portion of the link aligning a mounting hole in the cam with the mounting holes in the second structure;

moving the eccentric cam sideways into engagement with a locking plate on the second structure;

positioning a spacer washer between the mounting link and the second structure to prevent disengagement of the cam from the locking plate; and inserting a pin through the mounting holes of the structure, the cam and the spacer washer.

* * * * *